(12) United States Patent
Shen et al.

(10) Patent No.: US 10,327,040 B1
(45) Date of Patent: Jun. 18, 2019

(54) FORWARD ERROR CORRECTION FOR LOW LATENCY STREAMING

(71) Applicant: Twitch Interactive, Inc., San Francisco, CA (US)

(72) Inventors: Yueshi Shen, Cupertino, CA (US); Martin Hess, Soquel, CA (US); Shawn Hsu, San Jose, CA (US); Eran Ambar, Sunnyvale, CA (US); Abhinav Kapoor, Fremont, CA (US); Jorge Arturo Villatoro, San Francisco, CA (US); Spencer Nelson, Brooklyn, NY (US); Jeffrey Garneau, Durham, NC (US); Cyrus Hall, San Francisco, CA (US); Jyotindra Vasudeo, Berkeley, CA (US); Andrew Francis, San Francisco, CA (US); Yuechuan Li, Issaquah, WA (US); Chih-Chiang Lu, Fremont, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 15/719,242

(22) Filed: Sep. 28, 2017

(51) Int. Cl.
*H03M 13/00* (2006.01)
*H04N 21/63* (2011.01)
(Continued)

(52) U.S. Cl.
CPC ........... *H04N 21/631* (2013.01); *H04L 1/007* (2013.01); *H04L 1/0041* (2013.01); *H04N 21/2343* (2013.01); *H04N 21/6437* (2013.01)

(58) Field of Classification Search
CPC ............. H04N 21/631; H04N 21/2343; H04N 21/6437; H04L 1/0041; H04L 1/007
See application file for complete search history.

(56) References Cited

U.S. PATENT DOCUMENTS 9,788,077 B1    10/2017  Shen et al.
2004/0170431 A1  9/2004  Maciocco et al.
(Continued)

OTHER PUBLICATIONS

U.S. Appl. No. 15/719,131, filed Sep. 28, 2017, Shen et al.
U.S. Appl. No. 15/719,496, filed Sep. 28, 2017, Shen et al.
U.S. Appl. No. 15/719,193, filed Sep. 28, 2017, Shen et al.

*Primary Examiner* — Samir W Rizk
(74) *Attorney, Agent, or Firm* — BakerHostetler

(57) ABSTRACT

Techniques for low latency streaming, for example in a broadcasting environment, are described herein. In some examples, one or more individual renditions may be encoded into multiple rendition versions associated with different respective latencies. Also, in some examples, one or more individual renditions may be encoded into multiple rendition versions having different respective amounts of forward error correction (FEC), for example by an edge node of a video streaming service. Also, in some examples, video may be broadcast using a protocol that does not require retransmission of lost packets, such as Web Real-Time Communication (WebRTC), which is commonly used for point-to-point transmissions. Also, in some examples, one or more servers may receive quality of service feedback information from each player to which video content is transmitted. The one or more servers may use this feedback information to select and switch between appropriate renditions and rendition versions for each player.

18 Claims, 11 Drawing Sheets

(51) Int. Cl.
    *H04N 21/2343*     (2011.01)
    *H04L 1/00*     (2006.01)
    *H04N 21/6437*     (2011.01)

(56) References Cited

U.S. PATENT DOCUMENTS

| | | | |
|---|---|---|---|
| 2010/0077440 | A1 | 3/2010 | Medina et al. |
| 2011/0209025 | A1* | 8/2011 | Takahashi ............ H03M 13/356 714/752 |
| 2011/0242966 | A1* | 10/2011 | Van Caenegem ....... H04L 47/10 370/216 |
| 2013/0089142 | A1 | 4/2013 | Begen et al. |
| 2014/0143437 | A1 | 5/2014 | Mathur et al. |
| 2014/0281002 | A1 | 9/2014 | Sun |
| 2016/0044078 | A1 | 2/2016 | Hosur |
| 2016/0088322 | A1 | 3/2016 | Horev et al. |
| 2016/0119657 | A1 | 4/2016 | Sun |
| 2016/0234504 | A1* | 8/2016 | Good .................... H04N 19/146 |
| 2017/0126256 | A1* | 5/2017 | Salomons ............. H04L 1/0009 |
| 2017/0272485 | A1 | 9/2017 | Gordon et al. |
| 2017/0318070 | A1* | 11/2017 | Zaitsev ................. H04L 65/607 |
| 2017/0346697 | A1 | 11/2017 | Kumar et al. |
| 2018/0139258 | A1 | 5/2018 | Margolin et al. |

\* cited by examiner

FORWARD ERROR CORRECTION FOR LOW LATENCY STREAMING

BACKGROUND

The popularity of video streaming has increased rapidly in recent years. In some examples, video of a live event, such as a video game, news event, sporting event, etc. may be captured and streamed to viewers over one or more networks. In these cases, it may be desirable for video to be transmitted with low latency, for example such that actions within video may be seen by viewers while they are still occurring or shortly after their occurrence. This may, in some cases, be particularly advantageous when users are commenting, chatting or otherwise describing actions within these live events. In some examples, latency reduction may be particularly challenging when video content is being broadcast, meaning that it is being transmitted from a provider to multiple different viewers. Latency reduction may be more challenging in broadcast scenarios, for example as opposed to point-to-point transmissions, because provider resources in broadcast scenarios are not entirely focused on a particular single viewer.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
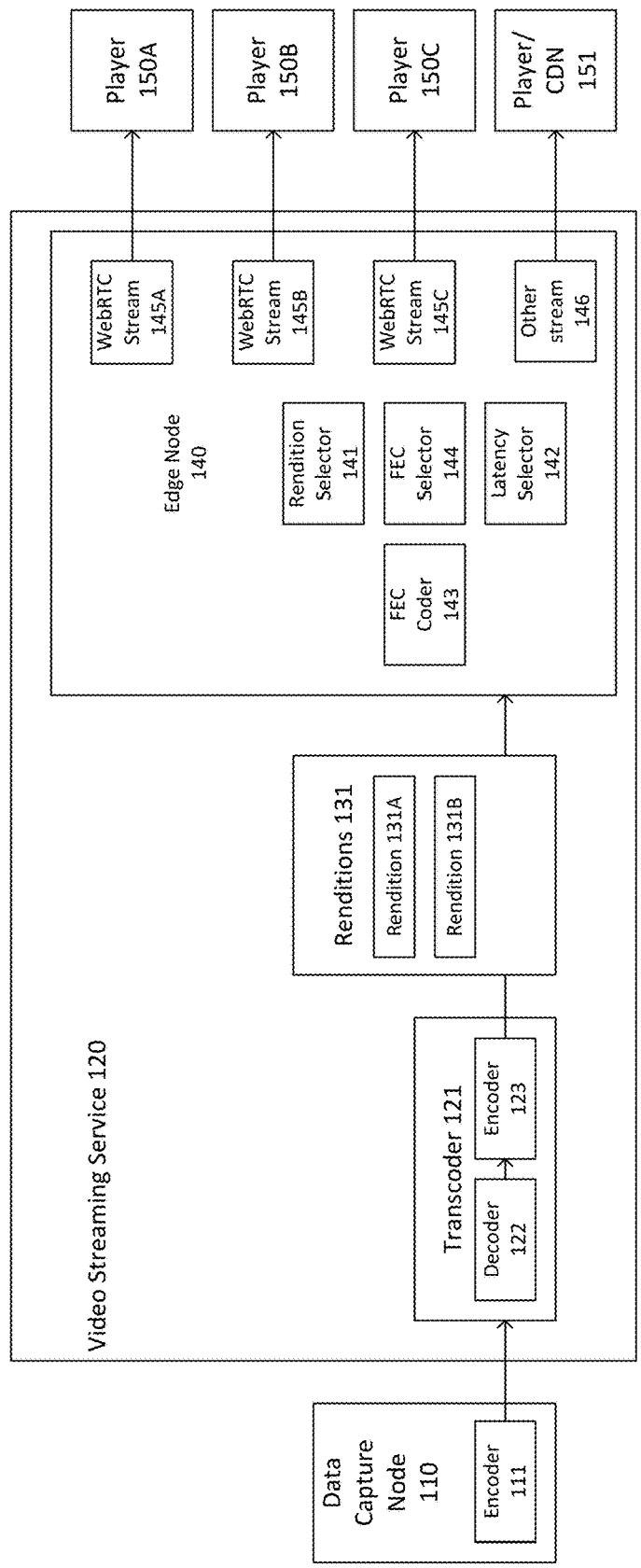
FIG. 1 is a diagram illustrating an example low latency video transmission system that may be used in accordance with the present disclosure.

Various techniques for low latency streaming, for example in a broadcasting environment, are described herein. The described techniques may employ various combinations of one or more features that, when employed individually or in combination, may reduce latency, in many cases substantially and without unreasonable negative impact on cost or quality. In some examples, the described techniques may be employed for streaming of video corresponding to a live event, such as a video game, sporting event, news event, or other live event. In some cases, the described techniques may allow actions within video to be seen by viewers while they are still occurring are shortly after their occurrence. In some examples, the described techniques may be employed by a video streaming service that receives encoded video captured and transmitted from a remote source, and then decodes and re-encodes the received video for transmission to multiple remote viewers. Additionally, in some examples, the described techniques may be employed in an adaptive bitrate streaming context, in which video is encoded into multiple different renditions having different respective image qualities (e.g., bitrates, resolutions, profiles, frame rates, etc.) and appropriate renditions are selected, and dynamically switched, for individual viewers based on changing network conditions and other characteristics.

One example latency reduction feature described herein involves encoding one or more individual renditions into multiple rendition versions associated with different respective latencies. In one specific example, a first rendition (e.g., a 1080p rendition) may be encoded into a 1080p higher latency version and a 1080p lower latency version. As another specific example, a second rendition (e.g., a 720p rendition) may be encoded into a 720p higher latency version and a 720p lower latency version. In some examples, to assist in reducing latency, the lower latency rendition versions may have a number of characteristics. In particular, in some cases, the lower latency versions may be permitted to include only predictive frames (P-frames). Thus, the lower latency versions may be prohibited from including instantaneous decoder refresh frames (IDR-frames) and bidirectional frames (B-frames). IDR-frames may tend to increase latency due to their large data sizes, and the exclusion of IDR-frames from the lower latency versions may therefore result in latency reduction. Additionally, the exclusion of B-frames from the lower latency versions may reduce latency by alleviating frame reordering delays. In some cases, the lower latency versions may be required to include only frames that each have the same (or within a specified threshold) amount of data as one another, which may serve to reduce the amount of data stored in the player buffer. Furthermore, in some cases, the lower latency versions may employ a low delay encoding configuration, such as without look ahead and using a minimum number of threads.

In some examples, switching to lower latency rendition versions may be permitted only when switching within the same rendition. For example, in some cases, switching to the 1080p lower latency version may be permitted only when switching from the 1080p higher latency version. Put another way, in some examples, when switching between renditions (e.g., between different resolutions, etc.), the switch may be permitted only to the higher latency version of the switched-to rendition. This may allow streaming components to adapt and settle to the higher latency version of a rendition first, and then switch to the lower latency version if network conditions have stabilized. In some examples, such as when the lower latency versions include only P-frames, it may be necessary to switch to the lower latency versions at P-frames, for example as opposed to instantaneous decoder refresh frames (IDR-frames) at which renditions are switched in traditional adaptive bitrate streaming techniques. In some cases, to allow P-frame switching, the first P-frame in each segment of the lower latency versions may be permitted to employ only a single respective reference frame. Additionally, subsequent P-frames in each segment of the lower latency versions may be permitted to reference only frames within their same respective segment. Furthermore, to allow P-frame switching, the higher latency versions may be required to end their segments with a reference frame (e.g., a P-frame).

Another example latency reduction feature described herein involves transmitting video using a protocol that does not require retransmission of lost packets, such as User Datagram Protocol (UDP) and Web Real-Time Communication (WebRTC), which is commonly used for point-to-point transmissions. By not retransmitting lost packets, further reductions in latency may be achieved. However, while not retransmitting lost packets may reduce latency, it may also result in transmissions being temporarily susceptible to corruptions when network conditions deteriorate, such as when packet loss rates and congestion increase. In some examples, application of forward error correction (FEC) to the streaming video may help to reduce the extent and duration of this corruption. While non-retransmitting protocols such as WebRTC may commonly be used for point-to-point communications, the techniques described herein may, in some examples, reduce latency in broadcasting scenarios by employing these non-retransmitting protocols in a broadcasting environment.

Yet another example latency reduction feature described herein involves encoding one or more individual renditions into multiple rendition versions having different respective amounts of FEC. In one specific example, a first rendition (e.g., a 1080p rendition) may be encoded into a 1080p higher FEC version and a 1080p lower FEC version. As another specific example, a second rendition (e.g., a 720p rendition) may be encoded into a 720p higher FEC version and a 720p lower FEC version. In yet other examples, one or more individual renditions may be encoded into multiple rendition versions associated with both different respective amounts of forward error correction (FEC) and different latencies. For example, a first rendition (e.g., a 1080p rendition) may be encoded into a 1080p higher latency—higher FEC version, a 1080p higher latency—lower FEC version, a 1080p lower latency—higher FEC version, and a 1080p lower latency—lower FEC version. Additionally, a second rendition (e.g., a 720p rendition) may be encoded into a 720p higher latency—higher FEC version, a 720p higher latency—lower FEC version, a 720p lower latency—higher FEC version, and a 720p lower latency—lower FEC version.

In some examples, a streaming service may include at least one transcoder that encodes the video content into multiple renditions. Additionally, in some examples, the transcoder may also encode each rendition into higher and lower latency versions as described above. In some examples, these multiple renditions and latency versions may be delivered to at least one streaming service edge node, which may stream the video content to multiple players over one or more networks. In some cases, the edge node may code each rendition and/or latency version received from the transcoder into multiple different FEC versions. In some examples, allowing the edge node to perform FEC coding (e.g., as opposed to performing FEC coding at the transcoder) may reduce costs and improve efficiency, for example by reducing the amount of data that is transmitted between the transcoder and the edge node.

Additionally, in some examples, the edge node may receive quality of service feedback information from each player, for example indicating packet loss rates, download speed information, bandwidth, congestion, and other quality of service information. In some cases, the edge node may use this feedback information to select and switch between appropriate renditions and rendition versions for each player. For example, in some cases, the edge node may, on a player-by-player basis, select an appropriate rendition (e.g., 1080p, 720p, etc.), an appropriate latency version (e.g., higher or lower latency) and/or an appropriate FEC version (e.g., higher or lower FEC). Selection of renditions and rendition versions by the streaming service (e.g., by the edge node) may differ from traditional adaptive bitrate streaming techniques in which rendition selection may be performed by each player/client. Selection of renditions and rendition versions by the streaming service may, for example, serve to reduce complexity and improve performance at the player/client, such as by reducing computational burden on the client to perform rendition selection. Moreover, server-side rendition selection may also improve security by allowing rendition selection algorithms, which may require investment of time and effort to create and improve, to be stored at a more secure server environment as opposed to a client/player.

As set forth above, in some examples, video content, including the selected renditions and rendition versions, may be streamed from the edge node to multiple players using WebRTC protocol. In some cases, when employing WebRTC protocol, because the encoded video content may be incompatible with WebRTC video channels, the video content may be streamed using at least one data channel of the Web RTC protocol. In some cases, use of a data channel, for example as opposed to a video channel, may allow video data to be transmitted without being constrained to a particular video format of a WebRTC video channel and may instead allow use of other video formats. Additionally, in some cases, the quality of service feedback data may be sent from the player to the edge node via at least one back channel. Additionally, it is noted that, while the above described techniques refer to transmission and streaming of video data, the techniques disclosed herein may also be applied to other types of data, such as audio data, and/or any combinations thereof.

FIG. 1 is a diagram illustrating an example low latency video transmission system that may be used in accordance with the present disclosure. As shown in FIG. 1, video content may be captured at a data capture node 110 and transmitted to a video streaming service 120, which, in turn, may transmit the video content to one or more recipients such as players 150A-B. In some examples, video content may also be transmitted to player/Content delivery Network (CDN) 151. In some examples, players 150A-C may be players that are affiliated with (e.g., that are developed and/or distributed by) the video streaming service 120, while player/CDN 151 may be a third-party player or CDN that is not directly affiliated with the streaming service 120. In some examples, video may be transmitted from data capture node 110 to video streaming service 120 and, in turn, from video streaming service 120 to players 150A-C and player/CDN 151 over one or more communications networks, for example one or more local area networks (LAN's) and/or one or more wide area networks (WAN's), such as the Internet. Additionally, in some examples, video may be transmitted from data capture node 110 to video streaming service 120 and, in turn, from video streaming service 120 to players 150A-C and player/CDN 151 using streaming transmission techniques, in which portions of transmitted content may be received and played while subsequent portions of the transmitted content are being transmitted. In some examples, the video content captured and transmitted by data capture node 110 may include video of a live event, such as a video game, sporting event, news event, or other live event. In some examples, users may be commenting, chatting or otherwise describing actions within these live events. In these and other cases, it may be particularly advantageous to reduce and minimize latency for video of live events.

In some examples, video capture node 110 may capture video using screen capture software, one or more cameras, and/or other video capture components. In the example of FIG. 1, encoder 111 of video capture node 110 may encode the captured video for transmission to video streaming service 120 over one or more networks. The transmitted video may be received by video streaming service 120 and provided to transcoder 121, at which decoder 122 may decode the incoming video. Encoder 123 may then re-encode the video for transmission to players 150A-N and player/CDN 151 over one or more networks.

Video may be transmitted from the video streaming service 120 using adaptive bitrate streaming, in which video is encoded into multiple different renditions 131 (including renditions 131A-B and potentially other renditions) having different respective image qualities (e.g., bitrates, resolutions, profiles, frame rates, etc.) and appropriate renditions are selected, and dynamically switched, for individual viewers based on changing network conditions and other characteristics. In some examples, encoder 123 may encode the source video content received from the video capture node 110 into the multiple different renditions 131. In one specific example, rendition 131A may be a 1080p resolution rendition of the video content, while rendition 131B may be a 720p resolution rendition of the video content. The encoded renditions 131 may then be delivered to edge node 140 for transmission to players 150A-C and player/CDN 151, such as using various techniques described in detail below. The edge node 140 is a node that transmits video content from the video streaming service 120 to one or more players.

Figure 2:
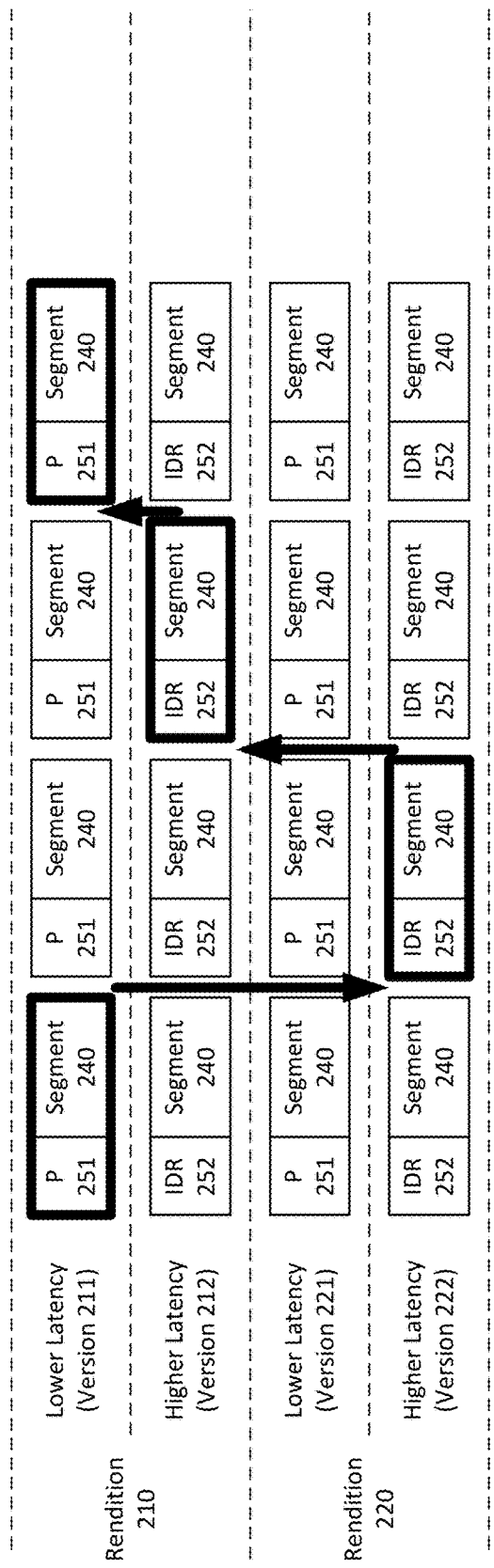
FIG. 2 is diagram illustrating example higher latency and lower latency rendition versions that may be used in accordance with the present disclosure.

In particular, in some examples, one or more individual renditions may be encoded into multiple rendition versions associated with different respective latencies. Referring now to FIG. 2, some example higher latency and lower latency rendition versions will now be described in detail. As shown, FIG. 2 depicts example portions of encodings for a first rendition 210 and a second rendition 220. In one specific example, rendition 210 may be a 1080p resolution rendition, while rendition 220 may be a 720p resolution rendition. It is noted, however, that renditions 210 and 220 may have various other different resolutions and/or other differing image quality characteristics (e.g., bitrates, profiles, frame rates, etc.). In the example of FIG. 2, rendition 210 is encoded into a higher latency version 212 and a lower latency version 211. Additionally, rendition 220 is encoded into a higher latency version 222 and a lower latency version 221.

In some examples, to assist in reducing latency, the lower latency versions 211 and 221 may have a number of characteristics. In particular, in some cases, the lower latency versions 211 and 221 may be permitted to include only predictive frames (P-frames). Thus, the lower latency versions 211 and 221 may be prohibited from including instantaneous decoder refresh frames (IDR-frames) and bidirectional frames (B-frames). IDR-frames may tend to increase latency due to their large data sizes, and the exclusion of IDR-frames from the lower latency versions 211 and 221 may therefore result in latency reduction. Additionally, the exclusion of B-frames from the lower latency versions 211 and 221 may reduce latency by alleviating frame reordering delays. Additionally, in some cases, the lower latency versions 211 and 221 may be required to include only frames that each have the same (or within a specified threshold) amount of data as one another, which may serve to reduce the amount of data stored in the player buffer. Furthermore, in some cases, the lower latency versions 211 and 221 may employ a low delay encoding configuration, such as without look ahead and using a minimum number of threads.

In some examples, switching to lower latency versions 211 and 221 may be permitted only when switching within the same rendition. For example, in some cases, switching to lower latency version 211 may be permitted only when switching from higher latency version 212 within the same rendition 210. As another example, switching to lower latency version 221 may be permitted only when switching from higher latency version 222 within the same rendition 220. Put another way, in some examples, when switching between renditions 210 and 220, the switch may be permitted only to the higher latency version (e.g., version 212 or 222) of the switched-to rendition. This may allow streaming components to adapt and settle to the higher latency version of a rendition first, and then switch to the lower latency version if network conditions have stabilized.

The use of only P-frames in lower latency versions 211 and 221 may, in some examples, also result in exclusion of instantaneous decoder refresh frames (IDR-frames) from the lower latency versions 211 and 221. In traditional adaptive bitrate streaming techniques, segments of encoded video typically begin with IDR frames. An IDR-frame is a special intra-coded picture frame (I-frame) that flushes all reference pictures in the DPB (decoded picture buffer), so that no following video frames can reference any picture prior to the IDR-frame. Thus, in some examples, because lower latency versions 211 and 221 may include only P-frames, their segments may begin with P-frames. By contrast, higher latency versions 212 and 222 may include segments that begin with IDR-frames as in traditional adaptive bitrate streaming techniques. These distinctions are shown in FIG. 2, in which lower latency versions 211 and 221 include segments 240 that begin with P-frames 251, while higher latency versions 212 and 222 include segments 240 that begin with IDR-frames 252.

When the lower latency versions 211 and 221 include segments 240 that begin with P-frames 251, it may be necessary to switch to the lower latency versions 211 and 221 at P-frames 251. By contrast, because higher latency versions 212 and 222 may include segments 240 that begin with IDR-frames 252, the higher latency versions 212 and 222 may instead be switched to at IDR-frames 252. In some cases, to allow P-frame switching for lower latency version 211 and 221, the first P-frame in each segment of the lower latency versions 211 and 221 may be permitted to employ only a single respective reference frame. Additionally, subsequent P-frames in each segment of the lower latency versions 211 and 221 may be permitted to reference only frames within their same respective segment. Furthermore, to allow P-frame switching, the higher latency versions 212 and 222 may be required to end their segments with a reference frame (e.g., a P-frame).

Some examples of P-frame and IDR-frame switching for higher latency and lower latency versions are also depicted in FIG. 2. For example, in FIG. 2, lower latency version 211 is selected for the first (i.e., left-most) segment (as indicated by the thick bold outlining surrounding the first segment in lower latency version 211). For the next segment, a determination is made to switch from rendition 210 to rendition 220. In this example, however, when switching between renditions, the switch must be made to the higher latency version of the switched-to rendition. Thus, in this example, when switching from rendition 210 to rendition 220, the switch is made to higher latency version 222 as opposed to lower latency version 221. Accordingly, higher latency version 222 of rendition 220 is selected for the second segment (as indicated by the thick bold outlining surrounding the second segment in higher latency version 222). Additionally, it is noted that the switch to higher latency version 222 is performed at an IDR-frame 252.

For the next segment, a determination is made to switch from rendition 220 back to rendition 210. As set forth above, however, when switching between renditions in this example, the switch must be made to the higher latency version of the switched-to rendition. Thus, in this example, when switching from rendition 220 to rendition 210, the switch is made to higher latency version 212 as opposed to lower latency version 211. Accordingly, higher latency version 212 of rendition 210 is selected for the third segment (as indicated by the thick bold outlining surrounding the third segment in higher latency version 212). Additionally, it is noted that the switch to higher latency version 212 is performed at an IDR-frame 252.

For the next segment, a determination is made to switch within rendition 210 from higher latency version 212 to lower latency version 211. In this case, the switch to the lower latency version 211 may be permitted because it is switching within the same rendition 210. Accordingly, lower latency version 211 of rendition 210 is selected for the fourth segment (as indicated by the thick bold outlining surrounding the fourth segment in lower latency version 211). Additionally, it is noted that the switch to lower latency version 211 is performed at a P-frame 251.

In order to further reduce latency, video may, in some examples, be transmitted using a protocol that does not require retransmission of lost packets, such as User Datagram Protocol (UDP) and Web Real-Time Communication (WebRTC), which is commonly used for point-to-point transmissions. Referring back to FIG. 1, it is seen that video content may be transmitted from edge node 140 to players 150A-C using WebRTC streams 145A-C. However, while not retransmitting lost packets may reduce latency, it may also result in transmissions being temporarily susceptible to corruptions when network conditions deteriorate, such as when packet loss rates and congestion increase. In some examples, application of forward error correction (FEC) to the streaming video may help to reduce the extent and duration of this corruption. While non-retransmitting protocols such as WebRTC may commonly be used for point-to-point communications, the techniques described herein may, in some examples, reduce latency in broadcasting scenarios by employing these non-retransmitting protocols in a broadcasting environment. It is noted that, even in cases when WebRTC or another less reliable protocol is used to transmit video from edge node 140 to players 150A-C, a more reliable protocol, such as hypertext transfer protocol (HTTP), may be used to transmit video between components within the video streaming service 120, such as from encoder 123 to edge node 140. Thus, in some examples, video may be transmitted from encoder 123 to edge node 140 using HTTP protocol. The edge node 140 may then convert and/or reformat the video from an HTTP protocol format to a WebRTC protocol format for transmission to players 150A-C. Additionally, in some examples, a single HTTP video version received from the encoder 123 may be transformed by the edge node 140 into multiple different WebRTC video versions, such as versions having different amounts of FEC as will be described in detail below.

Figure 3:
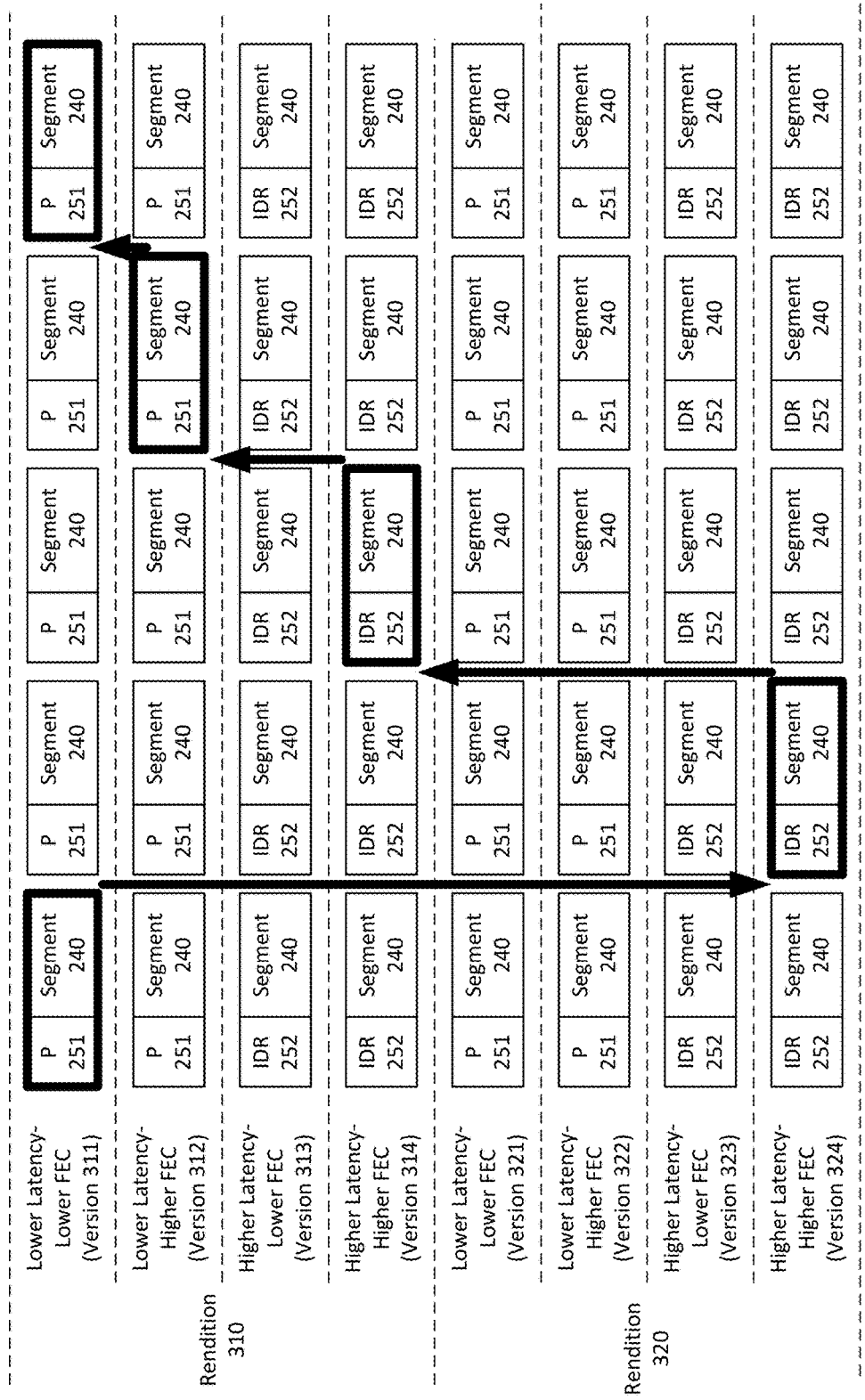
FIG. 3 is diagram illustrating example higher forward error correction (FEC) and lower FEC rendition versions may be used in accordance with the present disclosure.

In some examples, one or more individual renditions may be encoded into multiple rendition versions associated with different respective amounts of FEC. Referring now to FIG. 3, some example higher FEC and lower FEC rendition versions will now be described in detail. As shown, FIG. 3 depicts example portions of encodings for a first rendition 310 and a second rendition 320. In one specific example, rendition 310 may be a 1080p resolution rendition, while rendition 320 may be a 720p resolution rendition. In the example of FIG. 3, rendition 310 is encoded into a lower latency—lower FEC version 311, a lower latency—higher FEC version 312, a higher latency—lower FEC version 313, a higher latency—higher FEC version 314. Additionally, rendition 320 is encoded into a lower latency—lower FEC version 321, a lower latency—higher FEC version 322, a higher latency—lower FEC version 323, a higher latency—higher FEC version 324. It is noted that, while the particular example of FIG. 3 includes renditions that vary in both latency and FEC dimensions, there is no requirement that latency variance must be included with FEC variance (or vice-versa). Thus, for example, a particular rendition may include varying FEC versions without necessarily including varying latency versions. Additionally, for example, a particular rendition may include varying latency versions without necessarily including varying FEC versions (for example such as shown in FIG. 2). It is further noted that, in some examples, video content may be transmitted using only a single rendition with versions that differ in latency and/or FEC.

Some examples of switching between rendition versions in both latency and FEC dimensions are also depicted in FIG. 3. For example, in FIG. 3, lower latency—lower FEC version 311 is selected for the first (i.e., left-most) segment (as indicated by the thick bold outlining surrounding the first segment in lower latency—lower FEC version 311). For the next segment, a determination is made to switch from rendition 310 to rendition 320. In this example, however, when switching between renditions, the switch must be made to a higher latency version of the switched-to rendition. Additionally, in this example, a determination is made to switch to a higher FEC version of rendition 320. Thus, in this example, when switching from rendition 310 to rendition 320, the switch is made to higher latency—higher FEC version 324. Accordingly, higher latency—higher FEC version 324 of rendition 320 is selected for the second segment (as indicated by the thick bold outlining surrounding the second segment in higher latency—higher FEC version 324).

For the next segment, a determination is made to switch from rendition 320 back to rendition 310. As set forth above, however, when switching between renditions in this example, the switch must be made to a higher latency version of the switched-to rendition. Additionally, in this example, a determination is made to switch to maintain a higher FEC version. Thus, in this example, when switching from rendition 320 to rendition 310, the switch is made to higher latency—higher FEC version 314. Accordingly, higher latency—higher FEC version 314 of rendition 310 is selected for the third segment (as indicated by the thick bold outlining surrounding the third segment in higher latency—higher FEC version 314).

For the next segment, a determination is made to switch within rendition 310 to a lower latency version without changing the amount of FEC. Accordingly, lower latency—higher FEC version 312 of rendition 310 is selected for the fourth segment (as indicated by the thick bold outlining surrounding the fourth segment in lower latency—higher FEC version 312). In this case, the switch to version 312, which is a lower latency version, may be permitted because it is switching from within the same rendition 310.

For the next segment, a determination is made to switch within rendition 310 to a lower FEC version while retaining lower latency. Accordingly, lower latency—lower FEC version 311 of rendition 310 is selected for the fifth segment (as indicated by the thick bold outlining surrounding the fifth segment in lower latency—lower FEC version 311). In this case, the switch to version 311, which is a lower latency version, may be permitted because it is switching from within the same rendition 310.

Referring back to FIG. 1, it is seen that video streaming service 120 includes a transcoder 121 that encodes the video content into multiple renditions 131. Additionally, in some examples, the transcoder 121 may also encode each rendition into higher and lower latency versions, for example as shown in FIG. 2. In some examples, these multiple renditions 131 and latency versions may be delivered from transcoder 121 to edge node 140, which may stream the video content to players 150A-C and player/CDN 151 over one or more networks. In the example of FIG. 1, the edge node 140 includes an FEC coder 143, which may code each rendition 131 and/or latency version received from the transcoder 121 into multiple different FEC versions, for example as shown in FIG. 3. In some examples, allowing the edge node 140 to perform FEC coding (e.g., as opposed to performing FEC coding at the transcoder 121) may reduce costs and improve efficiency, for example by reducing the amount of data that is transmitted between the transcoder 121 and the edge node 140. As a specific example, if the transcoder 121 were to perform FEC coding as shown in the example of FIG. 3, then eight encoded versions (versions 311-314 and 321-324 of FIG. 3) would be transmitted from the transcoder to the edge node 140. By contrast, by performing FEC coding at the edge node 140, then only four encoded versions (versions 211, 212, 221 and 222 of FIG. 2) would be transmitted from the transcoder to the edge node 140. The edge node 140 would then apply FEC coding to encode versions 211, 212, 221, and 222 of FIG. 2 into versions 311-314 and 321-324 of FIG. 3. In some examples, the FEC coder 143 may perform FEC coding independently of the requirements of any particular player, for example as opposed to performing FEC coding separately for each individual player. Thus, FEC coding may not be performed on a on a player-by-player basis. Rather, the FEC coder 143 may instead code multiple different FEC versions, and the edge node 140 may then select a particular one of the coded FEC versions that is best suited for each individual player.

Figure 4:
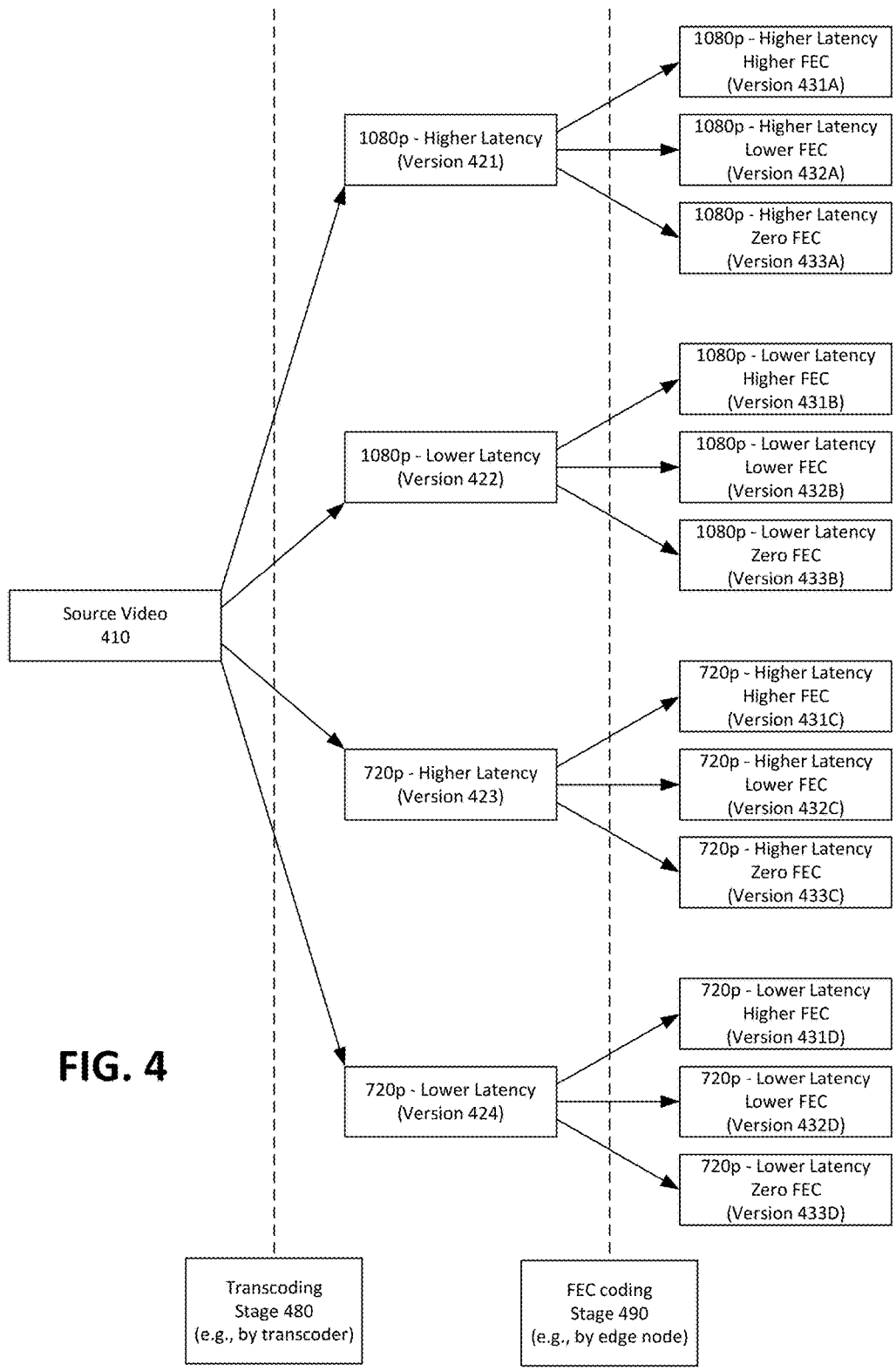
FIG. 4 is a diagram illustrating example transcoding and FEC edge coding that may be used in accordance with the present disclosure.

Referring now to FIG. 4, some examples of transcoding and FEC edge coding will now be described in detail. In particular, as show in FIG. 4, during a transcoding stage 480, source video 410 may be transcoded, for example by transcoder 121, into versions 421-424. In some examples, source video 410 may include video that is received by video streaming service 120 from data capture node 110. In the example, of FIG. 4, during transcoding stage 480, source video 410 may be transcoded into multiple different renditions each having multiple different latency versions. Specifically, in this example, source video 410 is encoded into 1080p higher latency version 421, 1080p lower latency version 422, 720p higher latency version 423, and 720p lower latency version 424. As also show in FIG. 4, during an FEC coding stage 490, FEC may be applied to each of versions 421-424, for example by edge node 140, to generate versions with varying amounts of FEC. Specifically, in this example, each of versions 421-424 may be FEC coded to result in respective higher FEC versions 431A-D, lower FEC versions 432A-D, and zero FEC versions 433A-D.

It is noted that, in some examples, zero FEC versions 433A-D may be identical to their respective transcoded versions 421-424 (since no FEC coding is applied to transcoded versions 421-424). In some examples, the higher FEC versions 431A-D and the lower FEC versions 432A-D may be used for video that is transmitted via WebRTC or another protocol that does not require retransmission of lost packets. Thus, in some examples, higher FEC versions 431A-D and the lower FEC versions 432A-D may be used for video that is transmitted to players 150A-C of FIG. 1 via respective WebRTC streams 145A-C. As set forth above, in some examples, players 150A-C may be players that are affiliated with (e.g., that are developed and/or distributed by) the video streaming service 120. Thus, in some examples, players 150A-C may be designed to process and play video that is coded with FEC. By contrast, in some examples, the zero FEC versions 433A-D may be used for video that is transmitted via Hyptertext Transfer Protocol (HTTP) or another protocol that requires retransmission of lost packets. Thus, in some examples, zero FEC versions 433A-D may be used for video that is transmitted to player/CDN 151 of FIG. 1 via other stream 146 (e.g., an HTTP stream). As set forth above, in some examples, player/CDN 151 may be a third-party player or CDN that is not directly affiliated with the streaming service 120. Thus, in some examples, player/CDN 151 may not be capable of playing/distributing video that is coded with FEC.

It is noted that FIG. 4 is merely intended to provide some examples of latency and FEC coding options, and that different renditions, latency versions, and FEC versions may be used. In some examples, the amounts of FEC applied to the higher FEC versions 431A-D and the lower FEC versions 432A-D may be static or may be adjusted and may change dynamically, such as throughout a transmission of video content. For example, in some cases, the amounts of FEC strengths for higher FEC versions 431A-D and the lower FEC versions 432A-D may be adjusted dynamically based on packet loss rates and other network conditions. For example, for cases in which packet loss rates during a transmission are observed to be relatively higher, more FEC versions with higher amounts of FEC may be provided. By contrast, for cases in which packet loss rates during a transmission are observed to be relatively lower, more FEC versions with lower amounts of FEC may be provided. Additionally, the number of available different FEC versions for each rendition may differ. For example, in some cases, because packet loss may often be rarer for higher image quality renditions, the higher image quality renditions might have only a single lower FEC version available with no higher FEC version. By contrast, in some cases, lower image quality renditions, for which packet loss may be more common, may have two, three, four, or more available different FEC versions. In some examples, the amount of FEC versions for each rendition may be static and may not change during a transmission of the video content. By contrast, in other examples, the amount of FEC versions for one or more renditions may be adjusted dynamically, such as throughout a transmission of video content, for example based on packet loss rates and other network conditions.

Figure 5:
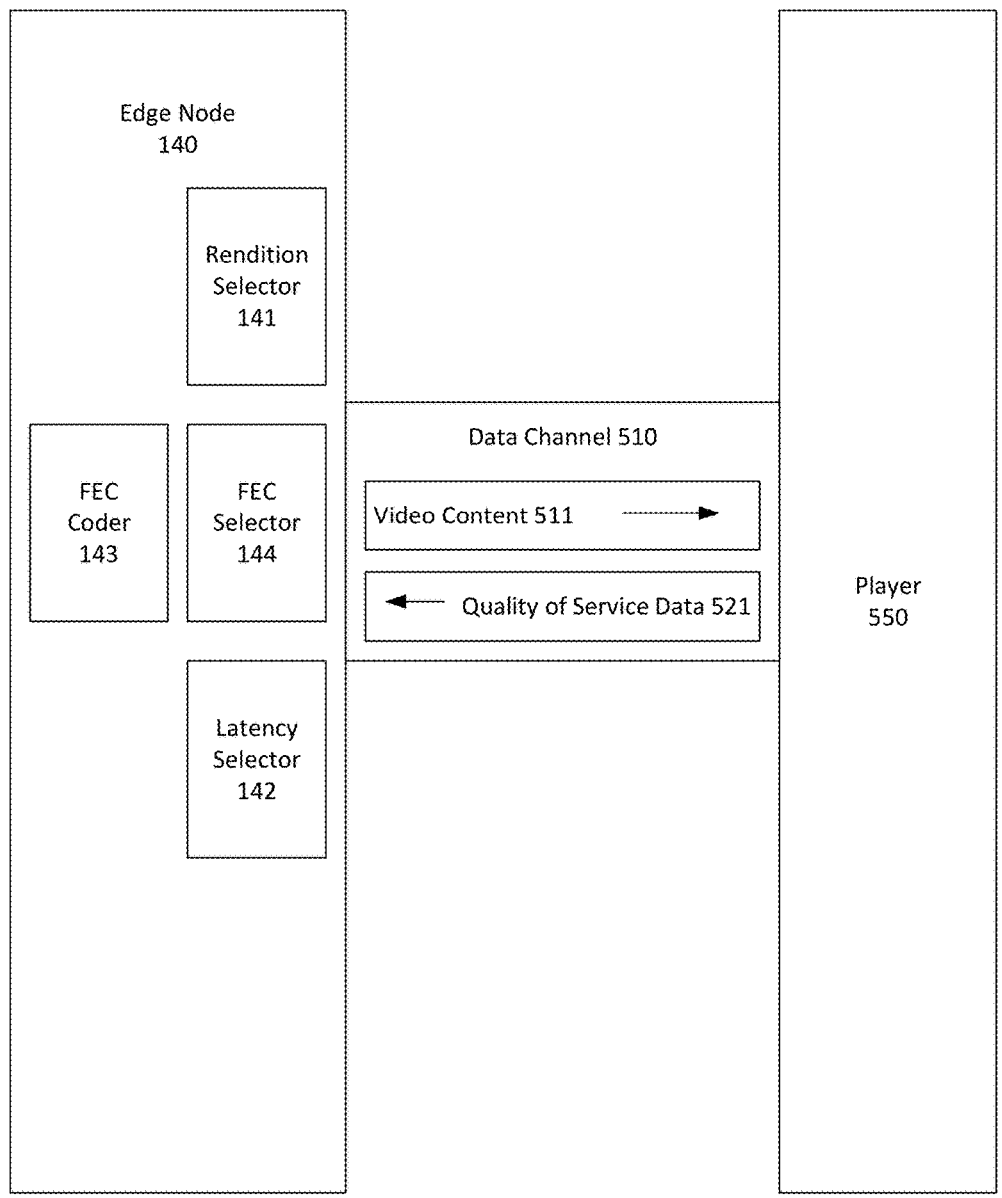
FIG. 5 is a diagram illustrating example communications between an edge node and a player that may be used in accordance with the present disclosure.

Referring now to FIG. 5, some example communications between the edge node and a player will now be described in detail. As shown in FIG. 5, edge node 140 may transmit video content 511 to a player 550 using WebRTC (or another protocol that does not require lost packet retransmission). In particular, in the example of FIG. 5, video content 511 is transmitted to player 550 over a data channel 510 of the WebRTC protocol. As also shown in FIG. 5, player 550 collects and transmits quality of service data 521 back to the edge node 140, for example over a back-channel of the data channel 510. In some examples, the quality of service data 521 may include packet loss rates, download speed information, bandwidth information, congestion information, and other quality of service information.

The edge node 140 may use the quality of service data 521 to select and switch between appropriate renditions and rendition versions for each player to which it transmits video content, including player 550. For example, in some cases, the edge node 140 may, on a player-by-player basis, select an appropriate rendition (e.g., 1080p, 720p, etc.), an appropriate latency version (e.g., higher or lower latency) and/or an appropriate FEC version (e.g., higher or lower FEC). In the example of FIG. 5, the edge node 140 includes a rendition selector 141, which may, in some examples, use the quality of service data 521 to select and switch between renditions. In some examples, when download speeds and other network conditions are high and/or improving, the rendition selector 141 may generally maintain and/or switch to higher image quality renditions. By contrast, in some examples, when download speeds and other network conditions are low and/or deteriorating, the rendition selector 141 may generally maintain and/or switch to lower image quality renditions. The edge node 140 also includes a latency selector 142, for example to select and switch between latency versions using techniques such as those described above. As described above, in some examples, latency selector 142 may select a higher latency version when switching between renditions. The latency selector may then use quality of service data 521 to determine when to switch to a lower latency version within the currently selected rendition, such as when quality of service data 521 indicates that network conditions have stabilized. The edge node 140 also includes an FEC selector 144, for example to select and switch between FEC versions using techniques such as those described above. For example, the FEC selector 144 may use quality of service data 521 to determine packet loss rates. In some examples, when packet loss rates are higher and/or improving, the FEC selector 144 may generally switch to and/or maintain higher FEC versions. By contrast, in some examples, when packet loss rates are lower and/or deteriorating, the FEC selector 144 may generally switch to and/or maintain lower FEC versions.

Selection of renditions and rendition versions by the streaming service 120 (e.g., by the edge node 140) may differ from traditional adaptive bitrate streaming techniques in which rendition selection may be performed by each player/client. Selection of renditions and rendition versions by the streaming service 120 may, for example, serve to reduce complexity and improve performance at the player/client, such as by reducing computational burden on the client to perform rendition selection. Moreover, server-side rendition selection may also improve security by allowing rendition selection algorithms, which may require investment of time and effort to create and improve, to be stored at a more secure server environment.

It is noted, however, that, while FIG. 5 depicts an example in which FEC versions are selected by edge node 140 at the video streaming service 120, there is no requirement that FEC versions (or any other renditions and/or versions) must be selected by a server. Rather, in some examples, a player and/or client may instead select and request a particular FEC version from the server, for example based on packet loss rates or other transmission characteristic information that may be collected by, or otherwise made available to, the player and/or client. In some examples, the server may send an indication of available FEC versions to the client, and the client may select one of the available versions based on factors such as described above.

Figure 6:
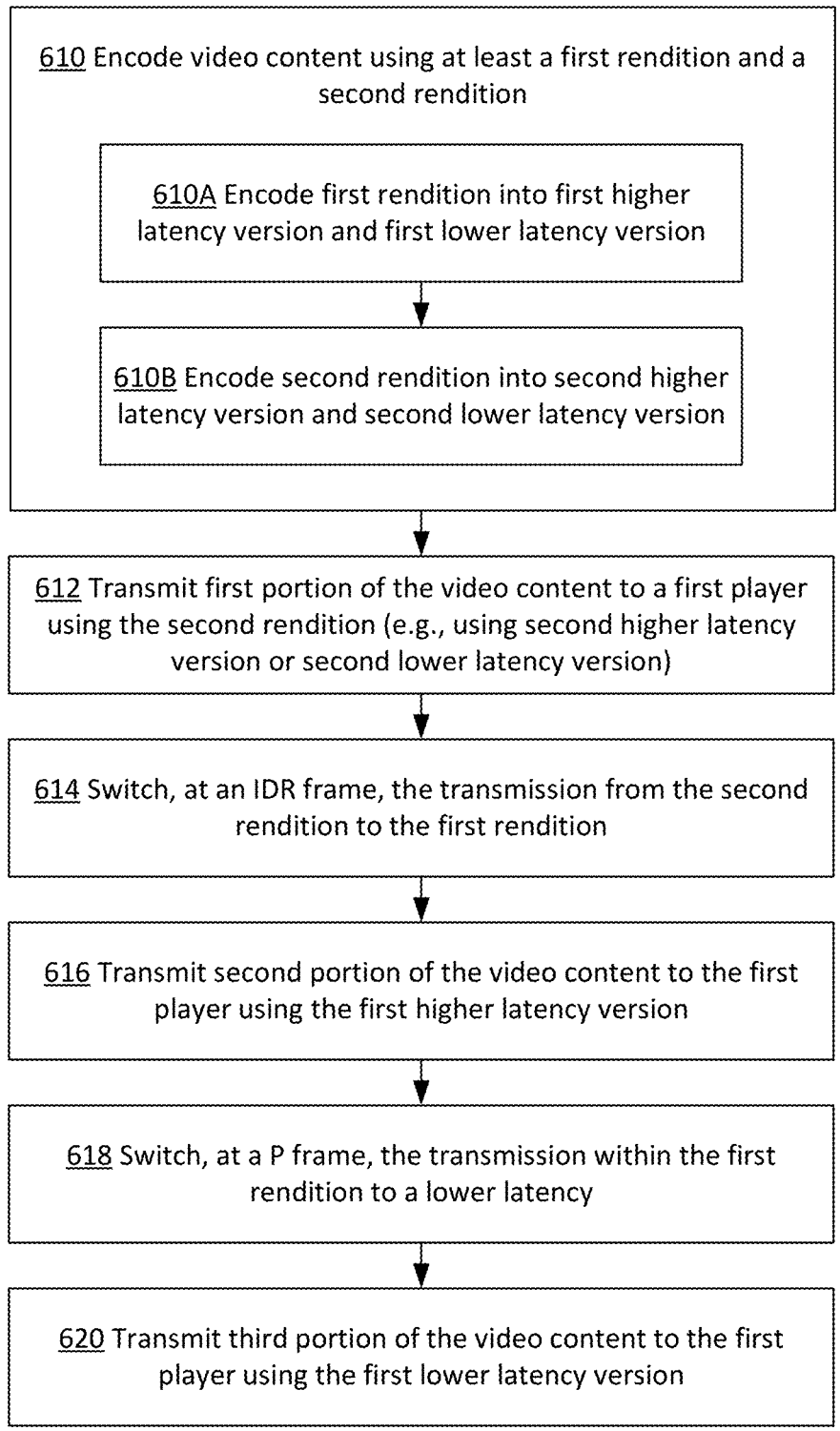
FIG. 6 is a flowchart illustrating an example process for intra-rendition latency variation that may be used in accordance with the present disclosure.

FIG. 6 is a flowchart illustrating an example process for intra-rendition latency variation that may be used in accordance with the present disclosure. At operation 610, video content is encoded using at least a first rendition and a second rendition. The first rendition may have a first image quality, and the second rendition may have a second image quality that is different from the first image quality. For example, in some cases, the first rendition may be a 1080p rendition, and the second rendition may be a 720p rendition. Other renditions with other different resolutions and/or other differing image quality characteristics (e.g., bitrates, profiles, frame rates, etc.) may also be employed.

In the example of FIG. 6, operation 610 includes sub-operations 610A and 610B. In particular, at sub-operation 610A, the first rendition is encoded into a first higher latency version and a first lower latency version. The first lower latency version may be associated with a lower latency than the first higher latency version. Additionally, at sub-operation 610B, the second rendition is encoded into a second higher latency version and a second lower latency version. The second lower latency version may be associated with a lower latency than the second higher latency version. One example of a first and second rendition with respective higher latency and lower latency versions is depicted in FIG. 2 and described in detail above.

As set forth above, in some examples, the lower latency versions may be permitted to include only predictive frames (P-frames). Thus, the lower latency versions may be prohibited from including instantaneous decoder refresh frames (IDR-frames) and bidirectional frames (B-frames). In some cases, the lower latency versions may be required to include only frames that each have the same (or within a specified threshold) amount of data as one another, which may serve to reduce the amount of data stored in the player buffer. For example, each frame in the first lower latency version may be required to have, within a specified threshold, a same amount of data as each other frame in the first lower latency version. As another example, each frame in the second lower latency version may be required to have, within a specified threshold, a same amount of data as each other frame in the second lower latency version. In some examples, the specified threshold may be zero (meaning that each frame is required to have the same amount of data). Furthermore, in some cases, the lower latency versions may employ a low delay encoding configuration, such as without look ahead and using a minimum number of threads. In some examples, switching to lower latency rendition versions may be permitted only when switching within the same rendition. Put another way, in some examples, when switching between renditions (e.g., between different resolutions, etc.), the switch may be permitted only to the higher latency version of the switched-to rendition. This may allow streaming components to adapt and settle to the higher latency version of a rendition first, and then switch to the lower latency version if network conditions have stabilized. In some examples, such as when the lower latency versions include only P-frames, it may be necessary to switch to the lower latency versions at P-frames, for example as opposed to instantaneous decoder refresh frames (IDR-frames) at which renditions are switched in traditional adaptive bitrate streaming techniques. In some cases, to allow P-frame switching, the first P-frame in each segment of the lower latency versions may use only one respective reference frame. Additionally, subsequent P-frames in each segment of the lower latency versions may be permitted to reference only frames within their same respective segment. Furthermore, to allow P-frame switching, the higher latency versions may be required to end their segments with a reference frame. For example, the higher latency versions may be required to end their segments with a P-frame.

At operation 612, a first portion of the video content is transmitted to a first player using the second rendition (e.g., using the second higher latency version or the second lower latency version). For example, as shown in FIG. 2, a first portion of video content (e.g., the second segment from the left, in this example) is transmitted using rendition 220 (e.g., the second rendition in this example). In particular, the first portion of video content is transmitted using higher latency version 222 (as indicated by the thick bold outlining surrounding the second segment in higher latency version 222).

At operation 614, transmission of the video content is switched from the second rendition to the first rendition. For example, due to changing network conditions, a determination may be made to switch-up to a higher image quality rendition or switch-down to a lower image quality rendition. In some examples, a determination may be made to switch-up to a higher image quality rendition when network conditions are improving, while a determination may be made to switch-down to a lower image quality rendition when network conditions are deteriorating. The switch between renditions at operation 614 may be made at an IDR-frame. As set forth above, when switching between renditions, the switch may be made only to the higher latency version of the switched-to rendition, which may include segments that begin with IDR-frames.

At operation 616, a second portion of the video content is transmitted to the first player using the first higher latency version. For example, as shown in FIG. 2, a second portion of video content (e.g., the third segment from the left, in this example) is transmitted using rendition 210 (e.g., the first rendition in this example). In particular, the second portion of video content is transmitted using higher latency version 212 (as indicated by the thick bold outlining surrounding the third segment in higher latency version 212).

At operation 618, transmission of the video content is switched within the first rendition to a lower latency. For example, in some cases, once it is determined that network conditions have stabilized while using the first rendition, a determination may be made to switch to a lower latency version within the first rendition, such as to reduce latency. The switch within the first rendition to the first lower latency version at operation 618 may be made at a P-frame. As set forth above, in some examples, lower latency versions may include only P-frames, and therefore switches to lower latency versions may occur at P-frames.

At operation 620, a third portion of the video content is transmitted to the first player using the first lower latency version. For example, as shown in FIG. 2, a third portion of video content (e.g., the fourth segment from the left, in this example) is transmitted using lower latency version 211 (as indicated by the thick bold outlining surrounding the fourth segment in lower latency version 211).

Figure 7:
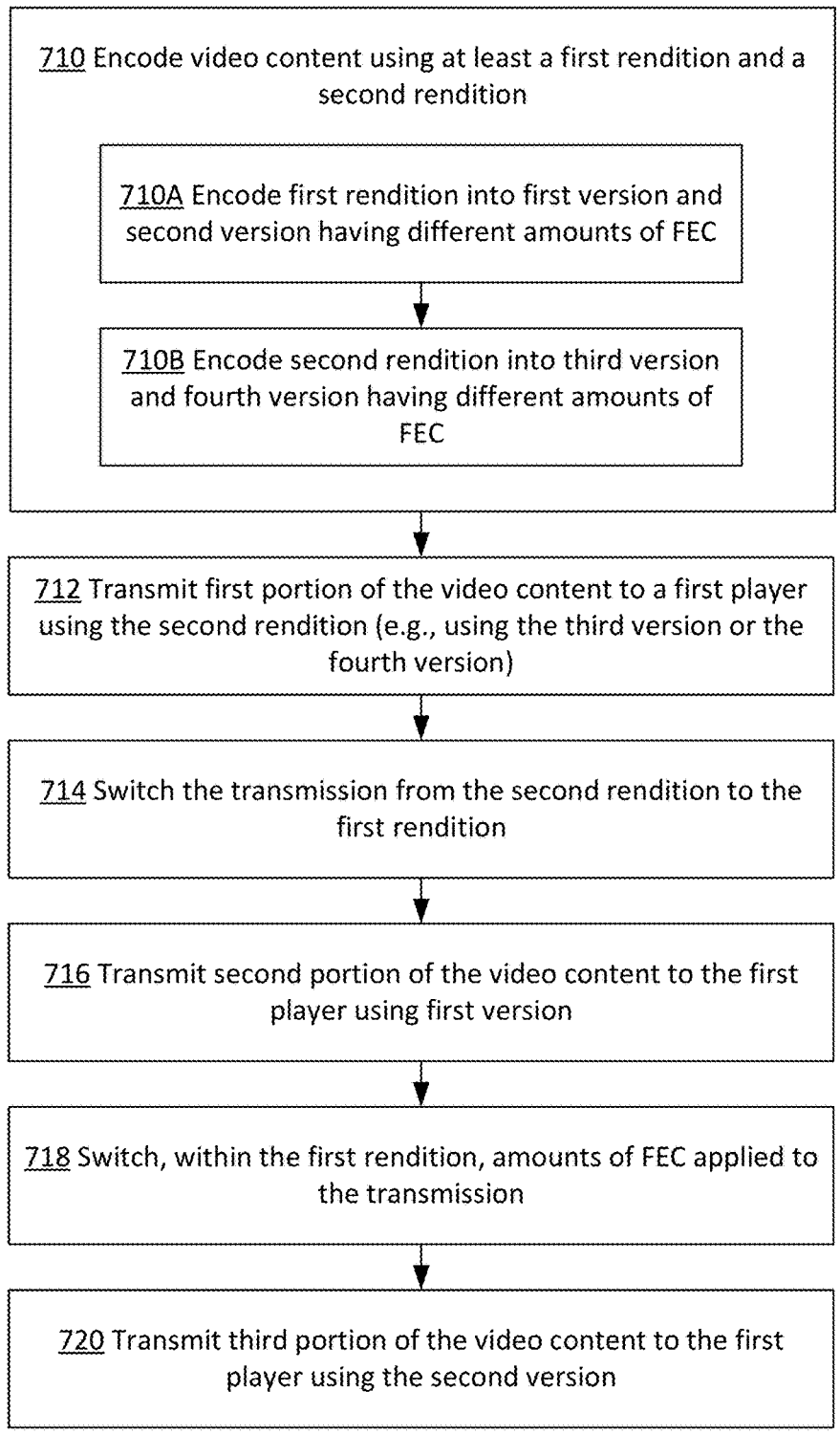
FIG. 7 is a flowchart illustrating an example process for intra-rendition FEC variation that may be used in accordance with the present disclosure.

FIG. 7 is a flowchart illustrating an example process for intra-rendition FEC variation that may be used in accordance with the present disclosure. At operation 710, video content is encoded using at least a first rendition and a second rendition. The first rendition may have a first image quality, and the second rendition may have a second image quality that is different from the first image quality. For example, in some cases, the first rendition may be a 1080p rendition, and the second rendition may be a 720p rendition. Other renditions with other different resolutions and/or other differing image quality characteristics (e.g., bitrates, profiles, frame rates, etc.) may also be employed.

In the example of FIG. 7, operation 710 includes sub-operations 710A and 710B. In particular, at sub-operation 710A, the first rendition is encoded into a first version and a second version having different respective amounts of FEC. Additionally, at sub-operation 610B, the second rendition is encoded into a third version and a fourth version having different respective amounts of FEC. One example of a first and second rendition with including different respective versions with different amounts of FEC is depicted in FIG. 3 and described in detail above.

At operation 712, a first portion of the video content is transmitted to a first player using the second rendition (e.g., using the third version or the fourth version). For example, as shown in FIG. 3, a first portion of video content (e.g., the second segment from the left, in this example) is transmitted using rendition 320 (e.g., the second rendition in this example). In particular, the first portion of video content is transmitted using higher latency—higher FEC version 324 (as indicated by the thick bold outlining surrounding the second segment in higher latency—higher FEC version 324).

At operation 714, transmission of the video content is switched from the second rendition to the first rendition. For example, due to changing network conditions, a determination may be made to switch-up to a higher image quality rendition or switch-down to a lower image quality rendition. In some examples, a determination may be made to switch-up to a higher image quality rendition when network conditions are improving, while a determination may be made to switch-down to a lower image quality rendition when network conditions are deteriorating.

At operation 716, a second portion of the video content is transmitted to the first player using the first version. For example, as shown in FIG. 3, a second portion of video content (e.g., the third segment from the left, in this example) is transmitted using rendition 310 (e.g., the first rendition in this example). In particular, the second portion of video content is transmitted using higher latency—higher FEC version 314 (as indicated by the thick bold outlining surrounding the third segment in higher latency—higher FEC version 314).

At operation 718, amounts of FEC applied to the transmission of the video content to the first player are switched within the first rendition. For example, in some cases, the amounts of FEC may be switched based, at least in part, on network conditions such as a packet loss rate associated with the transmission of the video content to the first player. In some examples, a switch may be made to a lower amount of FEC when packet loss rates are generally decreasing and/or lower. By contrast, in some examples, a switch may be made to a higher amount of FEC when packet loss rates are generally increasing and/or higher.

At operation 720, a third portion of the video content is transmitted to the first player using the first lower latency version. For example, as shown in FIG. 3, a third portion of video content (e.g., the fifth segment from the left, in this example) is transmitted using lower latency—lower FEC version 311 (as indicated by the thick bold outlining surrounding the fifth segment in lower latency—lower FEC version 311). Thus, in FIG. 3, a determination is eventually made to switch down to a lower amount of FEC after transmitting both the third segment and fourth segment using higher FEC versions of rendition 310 (e.g., versions 314 and 312).

Figure 8:
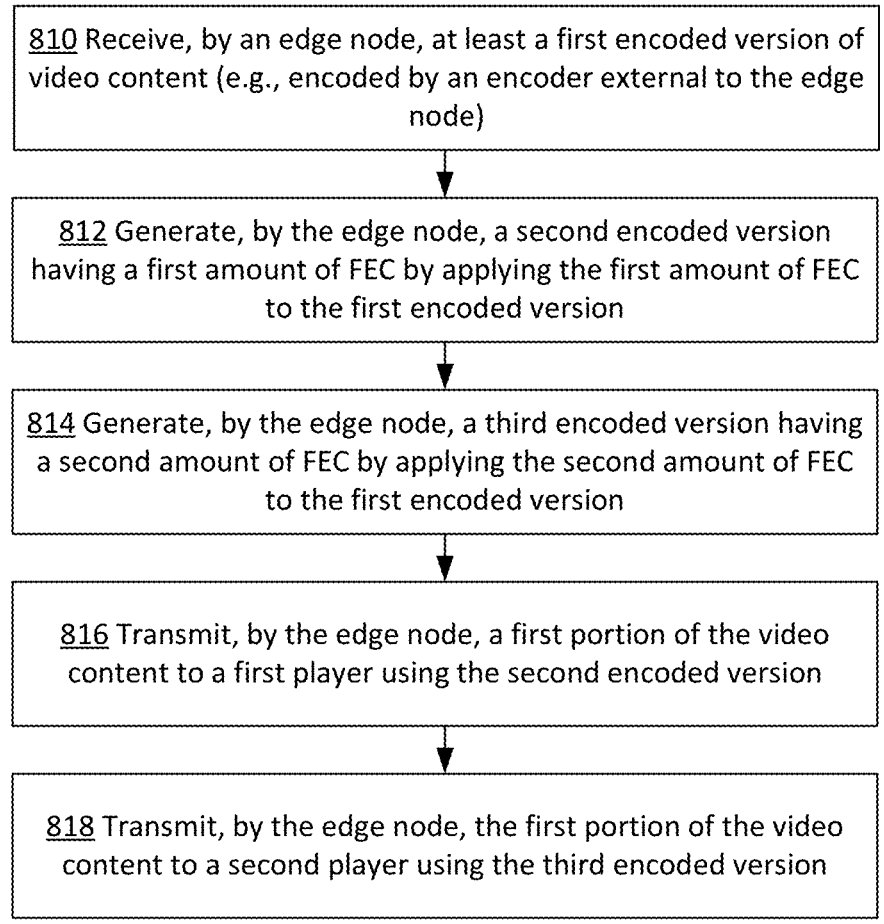
FIG. 8 is a flowchart illustrating an example process for application of FEC to broadcast streaming that may be used in accordance with the present disclosure.

FIG. 8 is a flowchart illustrating an example process for application of FEC to broadcast streaming that may be used in accordance with the present disclosure. At operation 810, an edge node (e.g., edge node 140 of video streaming service 120) receives at least a first encoded version of video content. In some examples, the video content may be transmitted by the edge node to a plurality of players over one or more communications networks. Also, in some examples, the first encoded version of the video content may be received from an encoder (e.g., encoder 123 of transcoder 121) that is external to the edge node. In some examples, the first encoded version of the video content may be a higher latency or lower latency version of a particular rendition of the video content. As shown in FIG. 4, the edge node may receive a 1080p higher latency version 421, a 1080p lower latency version 422, a 720p higher latency version 423, and a 720p lower latency version 424. In one specific example, the first encoded version of video content received at operation 810 may be 1080p higher latency version 421 (but could also be versions 422-424 and/or potentially other versions).

At operation 812, the edge node generates a second encoded version of the video content having a first amount of FEC by applying the first amount of FEC to the first encoded version. For example, as shown in FIG. 4, the edge node may generate a second encoded version (e.g., 1080p higher latency—higher FEC version 431A) by applying a high amount of FEC to 1080p higher latency version 421.

At operation 814, the edge node generates a third encoded version of the video content having a second amount of FEC by applying the second amount of FEC to the first encoded version. For example, as shown in FIG. 4, the edge node may generate a third encoded version (e.g., 1080p higher latency—lower FEC version 432A) by applying a low (but non-zero) amount of FEC to 1080p higher latency version 421.

At operation 816, the edge node transmits a first portion of the video content to a first player using the second encoded version. For example, in some cases, the edge node may transmit the first portion of the video content to the first player using 1080p higher latency—higher FEC version 431A of FIG. 4. As set forth above, in some examples, the second encoded version of the video content may be selected, for the first player, by the edge node based on quality of service feedback information for the first player that may be received by the edge node from the first player. In particular, in some examples, the quality of service feedback information for the first player may include packet loss rate information associated with the first player, and the second encoded version may be selected for transmission of the first portion of the video content to the first player based, at least in part, on the packet loss rate information associated with the first player. In one specific example, the packet loss rate information may indicate that the first player is experiencing a high packet loss rate, and a higher FEC version may be selected for transmission of the first portion of the video content to the first player based, at least in part, on the high packet loss rate.

At operation 818, the edge node transmits the first portion of the video content to the first player using the third encoded version. For example, in some cases, the edge node may transmit the first portion of the video content to the second player using 1080p higher latency—lower FEC version 432A of FIG. 4. As set forth above, in some examples, the third encoded version of the video content may be selected, for the second player, by the edge node based on quality of service feedback information for the second player that may be received by the edge node from the second player. In particular, in some examples, the quality of service feedback information for the second player may include packet loss rate information associated with the second player, and the third encoded version may be selected for transmission of the first portion of the video content to the second player based, at least in part, on the packet loss rate information associated with the second player. In one specific example, the packet loss rate information may indicate that the second player is experiencing a low packet loss rate, and a lower FEC version may be selected for transmission of the first portion of the video content to the second player based, at least in part, on the low packet loss rate.

Figure 9:
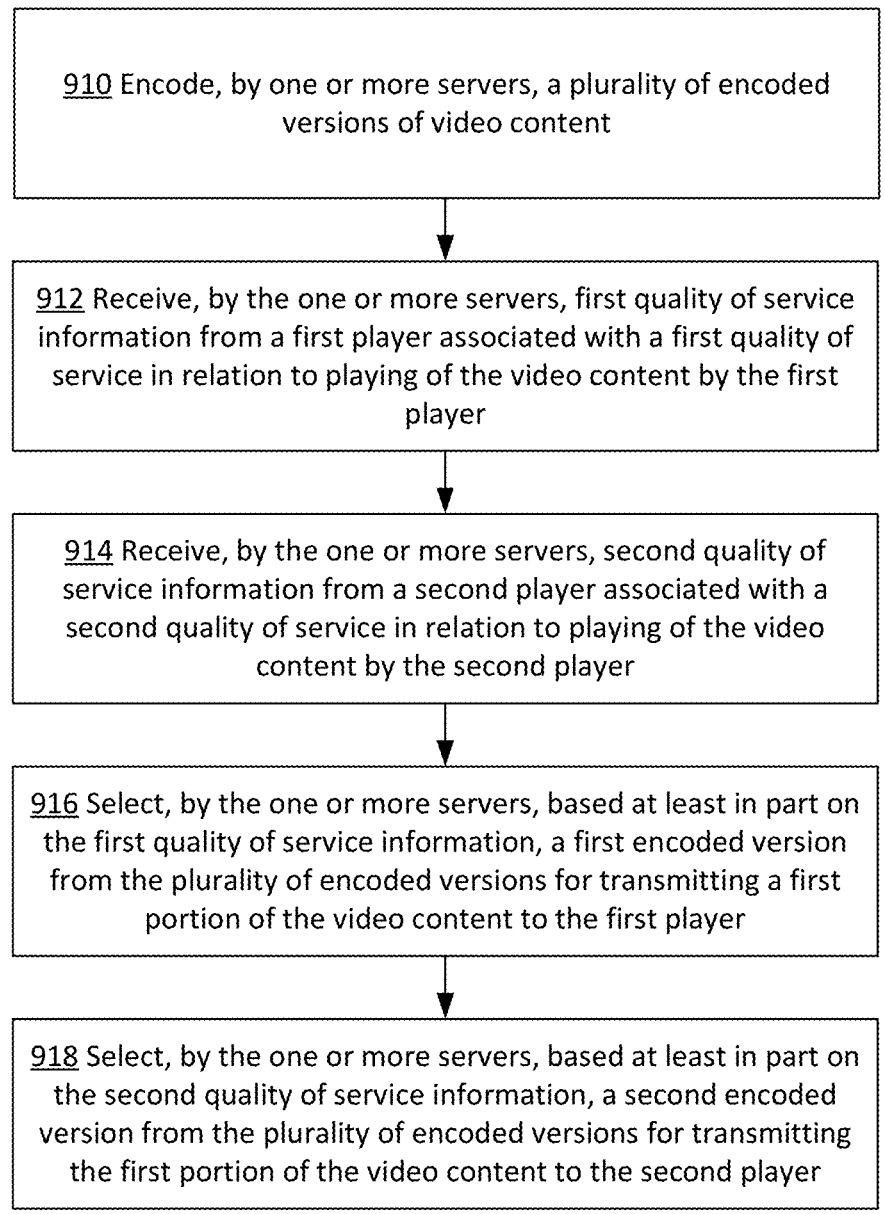
FIG. 9 is a flowchart illustrating an example process for server-based encoded version selection for streaming of video content that may be used in accordance with the present disclosure.

FIG. 9 is a flowchart illustrating an example process for server-based encoded version selection for streaming of video content that may be used in accordance with the present disclosure. The process of FIG. 9 may be performed by one or more servers. For example, in some cases, the process of FIG. 9 may be performed by video streaming service 120, which may include one or more servers. At operation 910, a plurality of encoded versions of video content are encoded by one or more servers. The video content may be transmitted by the one or more servers to a plurality of players over one or more communications networks. In some examples, the video content may be transmitted using a protocol that does not require retransmission of lost packets, such as WebRTC protocol, for example over a data channel. As a specific example, a plurality of encoded versions of video content are depicted in FIG. 3, such as including versions 311-314 and 321-324.

At operation 912, first quality of service information is received, by the one or more servers, from the first player, associated with a first quality of service in relation to playing of the video content by the first player. At operation 914, second quality of service information is received, by the one or more servers, from the second player, associated with a second quality of service in relation to playing of the video content by the second player. For example, as shown in FIG. 5 and described above, a video streaming service may receive quality of service information from each player to which it transmits video content. In some examples, quality of service information may be received over a backchannel In some examples, the quality of service information may include packet loss rates, download speed information, bandwidth information, congestion information, and other quality of service information associated with each respective player from which it is provided.

At operation 916, a first encoded version is selected from the plurality of encoded versions, by the one or more servers, based at least in part on the first quality of service information, for transmitting a first portion of the video content to the first player. In particular, in some examples, the one or more servers may select a rendition and/or image quality, an amount of latency, an amount of FEC, and/or other characteristics associated with the first encoded version based, at least in part, on the first quality of service information. At operation 918, a second encoded version is selected from the plurality of encoded versions, by the one or more servers, based at least in part on the second quality of service information, for transmitting a first portion of the video content to the second player. In particular, in some examples, the one or more servers may select a rendition, an amount of latency, an amount of FEC, and/or other characteristics associated with the second encoded version based, at least in part, on the second quality of service information. For example, as set forth above, the video streaming service may use the quality of service information to select and switch between appropriate renditions and rendition versions for each player to which it transmits video content. For example, in some cases, the video streaming service may, on a player-by-player basis, select an appropriate rendition (e.g., 1080p, 720p, etc.), an appropriate latency version (e.g., higher or lower latency) and/or an appropriate FEC version (e.g., higher or lower FEC). In some examples, the video streaming service may use the quality of service information to select and switch between renditions. In some examples, when download speeds and other network conditions are improving, the video streaming service may generally switch to higher image quality renditions. By contrast, in some examples, when download speeds and other network conditions are deteriorating, the video streaming service may generally switch to lower image quality renditions. Additionally, in some examples, the video streaming service may select and switch between latency versions using techniques such as those described above. As described above, in some examples, the video streaming service may select a higher latency version when switching between renditions. The video streaming service may then use quality of service information to determine when to switch to a lower latency version within the currently selected rendition, such as when the quality of service information indicates that network conditions have stabilized. Furthermore, in some examples, the video streaming service may select and switch between FEC versions using techniques such as those described above. For example, the video streaming service may use quality of service information to determine packet loss rates. In some examples, when packet loss rates are higher, the video streaming service may generally switch to and/or maintain higher FEC versions. By contrast, in some examples, when packet loss rates are lower, the video streaming service may generally switch to and/or maintain lower FEC versions.

Figure 10:
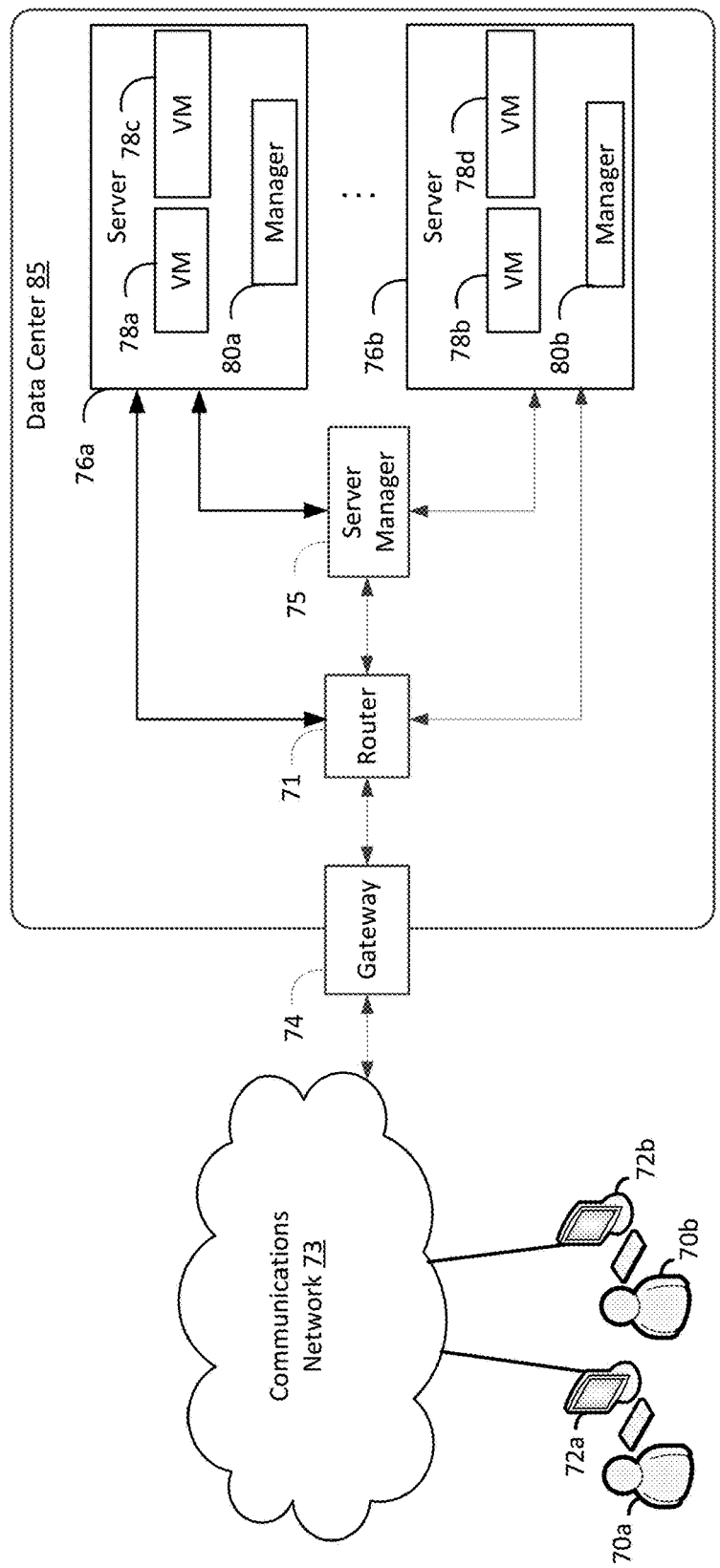
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
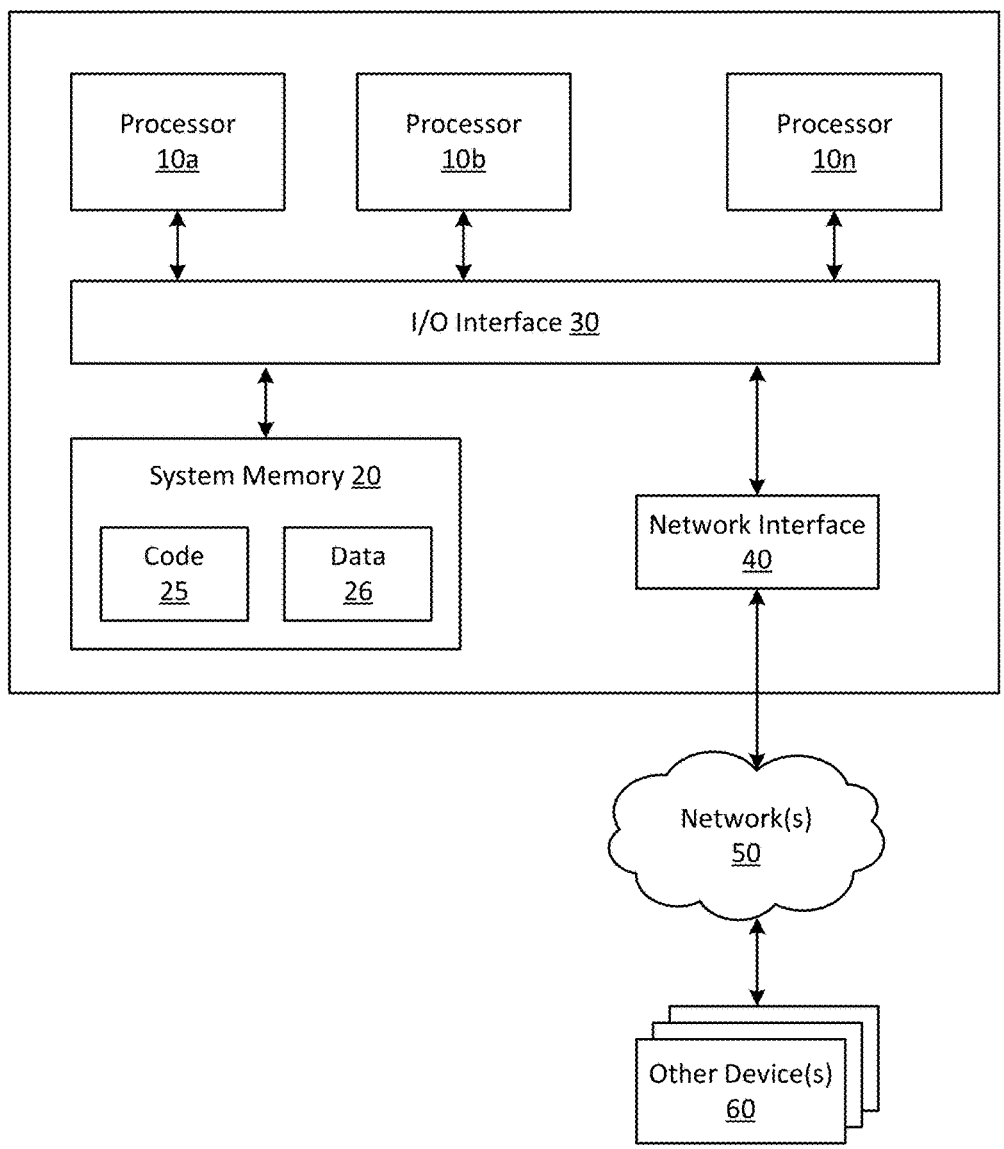
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for application of forward error correction (FEC) comprising:
   one or more processors; and
   one or more memories having stored therein instructions that, upon execution by the one or more processors, cause the computing system to perform operations comprising:
      receiving, by an edge node of a video streaming service, from an encoder external to the edge node, at least a first encoded version of video content, wherein the video content is transmitted by the edge node to a plurality of players over one or more communications networks;
      generating, by the edge node, a second encoded version of the video content having a first amount of FEC by applying the first amount of FEC to the first encoded version;
      generating, by the edge node, a third encoded version of the video content having a second amount of FEC by applying the second amount of FEC to the first encoded version;
      selecting, by the edge node, the second encoded version for transmission of a first portion of the video content to a first player of the plurality of players, wherein the edge node selects the second encoded version based, at least in part, on first packet loss rate information for the first player;
      transmitting, by the edge node, the first portion of the video content to the first player using the second encoded version;
      selecting, by the edge node, the third encoded version for transmission of the first portion of the video content to a second player of the plurality of players, wherein the edge node selects the third encoded version based, at least in part, on second packet loss rate information for the second player; and
      transmitting, by the edge node, the first portion of the video content to the second player using the third encoded version.

2. The computing system of claim 1, wherein the video content is transmitted by the edge node to the plurality of players using Web Real-Time Communication protocol.

3. The computing system of claim 1, wherein the first encoded version is a higher latency version of a first rendition, and wherein the edge node further receives a lower latency version of the first rendition and applies FEC to the lower latency version.

4. The computing system of claim 1, wherein the first encoded version is a lower latency version of a first rendition, and wherein the edge node further receives a higher latency version of the first rendition and applies FEC to the higher latency version.

5. A computer-implemented method for application of forward error correction (FEC) comprising:
   receiving, by a first node, at least a first encoded version of video content, wherein the video content is transmitted by the first node to a plurality of recipients over one or more communications networks;
   generating, by the first node, a second encoded version of the video content having a first amount of FEC by applying the first amount of FEC to the first encoded version;
   generating, by the first node, a third encoded version of the video content having a second amount of FEC by applying the second amount of FEC to the first encoded version;
   selecting, by the first node, the second encoded version for transmission of a first portion of the video content to a first recipient of the plurality of recipients, wherein the first node selects the second encoded version based, at least in part, on first packet loss rate information for the first recipient;
   transmitting, by the first node, the first portion of the video content to the first recipient using the second encoded version;
   selecting, by the first node, the third encoded version for transmission of the first portion of the video content to a second recipient of the plurality of recipients, wherein the first node selects the third encoded version based, at least in part, on second packet loss rate information for the second recipient; and
   transmitting, by the first node, the first portion of the video content to the second recipient using the third encoded version.

6. The computer-implemented method of claim 5, wherein the video content is transmitted by the first node to the plurality of recipients using Web Real-Time Communication protocol.

7. The computer-implemented method of claim 5, wherein the first amount of FEC applied to the first encoded version to generate the second encoded version changes during transmission of the video content.

8. The computer-implemented method of claim 5, wherein the first node is an edge node of a video streaming service.

9. The computer-implemented method of claim 8, wherein the first encoded version is received by the edge node from an encoder of the video streaming service that is external to the edge node.

10. The computer-implemented method of claim 5, wherein the first encoded version is a higher latency version of a first rendition, and wherein the first node further receives a lower latency version of the first rendition and applies FEC to the lower latency version.

11. The computer-implemented method of claim 5, wherein the first encoded version is a lower latency version of a first rendition, and wherein the first node further receives a higher latency version of the first rendition and applies FEC to the higher latency version.

12. One or more non-transitory computer-readable storage media having stored thereon instructions that, upon execution by one or more computing devices, cause the one or more computing devices to perform operations comprising:
   receiving, by a first node, at least a first encoded version of video content, wherein the video content is transmitted by the first node to a plurality of recipients over one or more communications networks;

generating, by the first node, a second encoded version of the video content having a first amount of forward error correction (FEC) by applying the first amount of FEC to the first encoded version;

generating, by the first node, a third encoded version of the video content having a second amount of FEC by applying the second amount of FEC to the first encoded version;

selecting, by the first node, the second encoded version for transmission of a first portion of the video content to a first recipient of the plurality of recipients, wherein the first node selects the second encoded version based, at least in part, on first packet loss rate information for the first recipient;

transmitting, by the first node, the first portion of the video content to the first recipient using the second encoded version;

selecting, by the first node, the third encoded version for transmission of the first portion of the video content to a second recipient of the plurality of recipients, wherein the first node selects the third encoded version based, at least in part, on second packet loss rate information for the second recipient; and transmitting, by the first node, the first portion of the video content to the second recipient using the third encoded version.

13. The one or more non-transitory computer-readable storage media of claim 12, wherein the video content is transmitted by the first node to the plurality of recipients using Web Real-Time Communication protocol.

14. The one or more non-transitory computer-readable storage media of claim 12, wherein the first amount of FEC applied to the first encoded version to generate the second encoded version changes during transmission of the video content.

15. The one or more non-transitory computer-readable storage media of claim 12, wherein the first node is an edge node of a video streaming service.

16. The one or more non-transitory computer-readable storage media of claim 15, wherein the first encoded version is received by the edge node from an encoder of the video streaming service that is external to the edge node.

17. The one or more non-transitory computer-readable storage media of claim 12, wherein the first encoded version is a higher latency version of a first rendition, and wherein the first node further receives a lower latency version of the first rendition and applies FEC to the lower latency version.

18. The one or more non-transitory computer-readable storage media of claim 12, wherein the first encoded version is a lower latency version of a first rendition, and wherein the first node further receives a higher latency version of the first rendition and applies FEC to the higher latency version.

* * * * *